June 27, 1939.　　　G. G. KITZEMAN　　　2,164,072
BASTING DEVICE FOR COOKING MEATS, VEGETABLES, AND THE LIKE
Filed Feb. 25, 1937
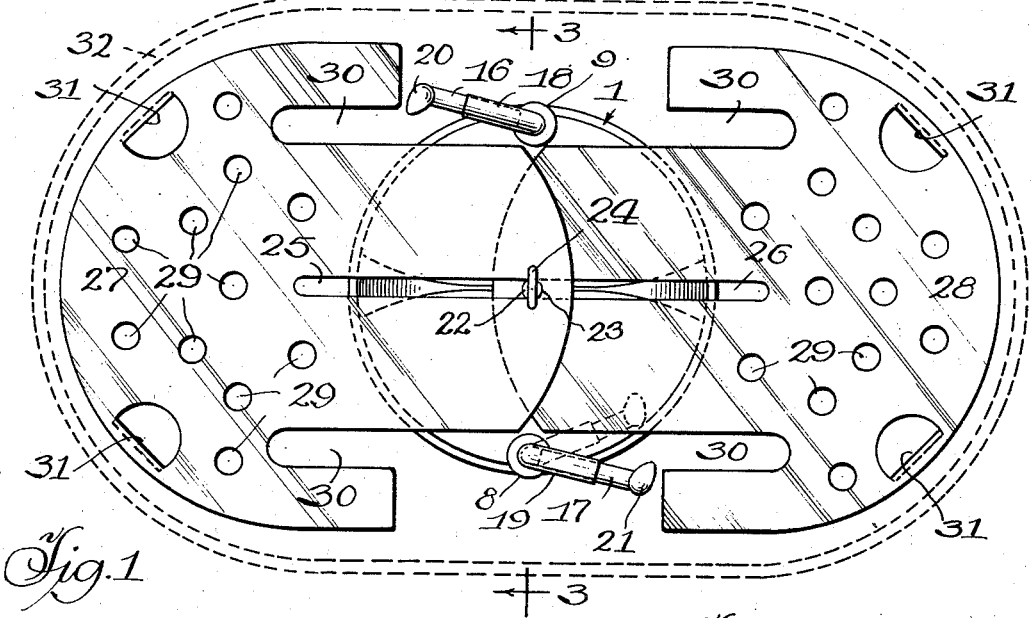
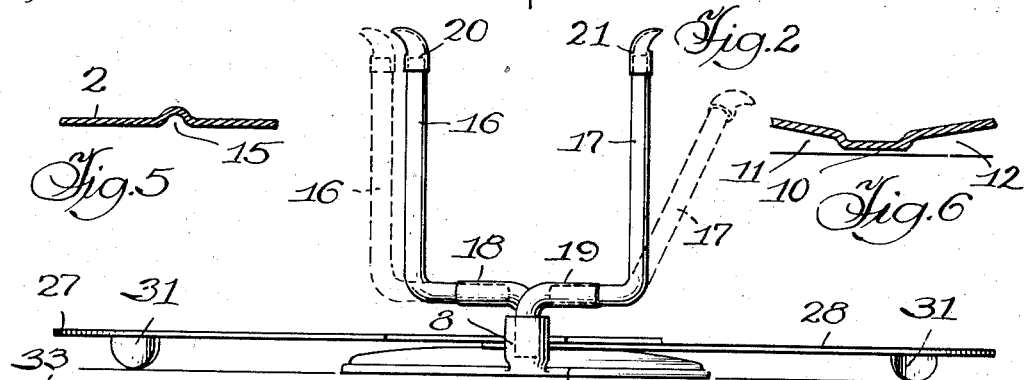
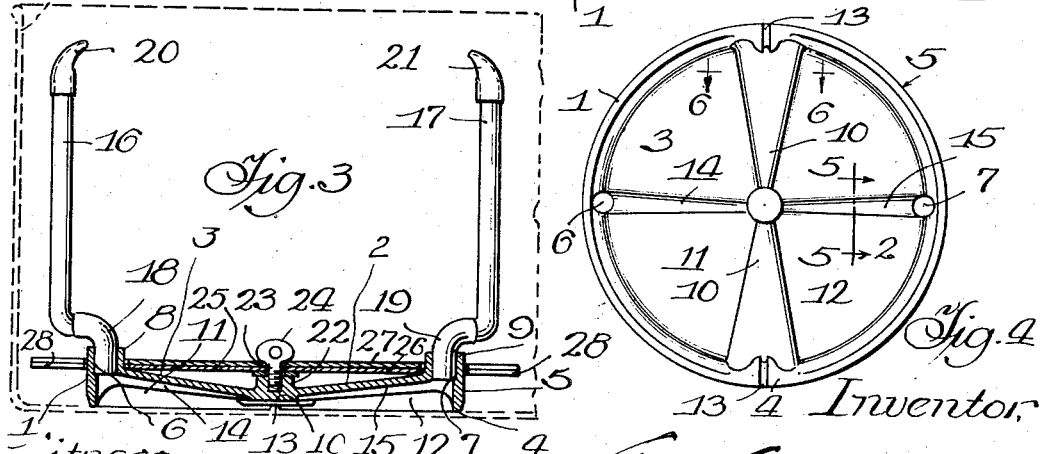
Inventor
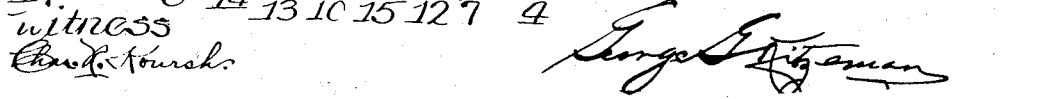

Patented June 27, 1939

2,164,072

UNITED STATES PATENT OFFICE 2,164,072

BASTING DEVICE FOR COOKING MEATS, VEGETABLES, AND THE LIKE

George G. Kitzeman, Chicago, Ill.

Application February 25, 1937, Serial No. 127,626

9 Claims. (Cl. 53—6)

This invention relates to a device for basting food materials during cooking and more particularly to such device that when placed in a cooking vessel with the food material and heat applied to the vessel, will operate within the vessel without the necessity of lifting the lid.

The old method of basting meat, vegetables and other food materials, by lifting the lid of the cooking vessel and transferring the hot juices and liquids from the bottom of the vessel to the top of and over the food with a spoon or the like, is not only an awkward and sometimes painful operation, but is laborious and inefficient because of the frequent necessity of lifting the hot lid which, each time it is lifted, results in the loss of considerable heat that should be retained within the vessel.

My present invention eliminates the necessity of lifting the lid and the above mentioned disadvantages, and enables the basting of the food in the vessel to be continuously carried out with much greater efficiency and in a manner that produces a more delicious product of far superior quality, appearance and value.

Among the objects of my invention is to provide improved means for basting food during cooking whereby when the cooking operation is under way the basting will be continuously and effectively carried out without further effort or attention on the part of the cook.

A further object is to provide a duplex basting device having two basting tubes that may be positioned one on each side of the food being cooked.

A still further object is to provide a basting device having adjustable basting tubes whereby to vary the direction of delivery of the spray of juices and liquids and to accommodate various sizes and shapes of vessels.

Another object is to provide a universal basting device as an accessory that may be used in substantially all vessels suitable for cooking meats, vegetables and the like, without the necessity of purchasing a specially constructed vessel for the device.

A further object is the provision of an adjustable rack or support for the food for use in either round or oblong vessels.

A still further object is the provision of a basting device of greater adaptability, efficiency, economy and better operation.

Other objects, advantages and capabilities are inherent in the device and will later more fully appear.

My invention further resides in the combination, construction and arrangement of parts illustrated in the accompanying drawing, and while I have shown therein a preferred embodiment I wish it understood that the same is susceptible of modification and change without departing from the spirit of my invention.

In the drawing:

Fig. 1 is a plan view of a device embodying my invention and showing the adjustable rack or support applied to my basting device and adjusted to position for an oblong vessel.

Fig. 2 is a side elevation of the structure shown in Fig. 1.

Fig. 3 is a vertical transverse section taken on the line 3—3 of Fig. 1.

Fig. 4 is a plan view of the underside of the base plate or body portion of my basting device.

Fig. 5 is a section on the line 5—5 of Fig. 4.

Fig. 6 is a section on the line 6—6 of Fig. 4.

Referring more in detail to the drawing, my improved basting device comprises a base plate 20 or body portion 1, preferably but not necessarily of circular outline, and formed of two symmetrical side portions 2 and 3. The various portions of the lower edge 4 of the marginal flange 5 lie in the same plane so that said lower edge throughout its circumference (except for the drain notches hereinafter referred to) will lie in close contact with the bottom of the vessel within which my device is used, regardless of whether said bottom is flat or concaved. As seen in Fig. 3, the two symmetrical side portions 2 and 3 incline upwardly and outwardly from adjacent the center line to form wedge-shaped liquid spaces 11 and 12 therebeneath, so shaped as to promote the guidance of bubbles formed in said liquid spaces to the openings 6 and 7 formed in the upstanding bosses 8 and 9 at the central marginal portions of said side portions 2 and 3.

The under face of the ridge or juncture 10 of the two inclined side portions 2 and 3 is spaced a slight distance above the plane of the lower edges 4 so that when the device is used in a vessel having a flat bottom there will be at least a slight communication between the two inclined liquid spaces 11 and 12 on the opposite sides of the center line of said juncture to facilitate a more or less equal distribution of liquid in the two spaces. To enable the basting juices or liquid in the bottom of the pan to find access to the spaces 11 and 12 underneath the base or body portion 1 of my device, the bottom edge 4 is provided with two or more notches 13 which are preferably positioned ninety degrees from the openings 6 and 7 or, in other words, midway between said latter openings. As will be seen from Fig. 3, the openings 6 and 7 are positioned to communicate directly with the highest portions of the inclined liquid spaces 11 and 12 so as to facilitate the passage of bubbles formed in said spaces to said openings.

To further facilitate the passage of bubbles in said liquid spaces 11 and 12 to openings 6 and 7, tapering grooves 14 and 15 are formed in the under faces of the symmetrical side portions 2 and 3, and leading from near the center of the base plate 1 to the openings 6 and 7, as shown in Fig. 4, these grooves preferably increasing in width and depth as they approach the openings 6 and 7. It will thus be seen that any bubbles formed in the liquid in the liquid spaces 11 and 12 as the liquid therein nears the boiling point will be guided or find their way to the openings 6 and 7, and thence upwardly into the basting tubes 16 and 17 hereinafter more fully explained.

The basting tubes 16 and 17 are provided at their lower ends with bent tubes 18 and 19 respectively, which latter tubes at their lower ends rotatably but snugly fit into the slightly tapered openings 6 and 7 in bosses 8 and 9, and at their upper outwardly extending ends telescopically receive the lower ends of tubes 16 and 17 so that these telescoping joints will permit rotation and longitudinal sliding between the parts to permit a wide range of adjustability of the basting tubes. At their upper end each of the basting tubes 16 and 17 may or may not, as desired, carry nozzle portions 20 and 21, which are rotatably and longitudinally slidably mounted on tubes 16 and 17, respectively, to permit of further adjustability. From the above it will be readily apparent that the basting tubes may be swung around and adjusted in or out so as to give a wide variety of adjustment and adapt my basting device to various sized vessels as well as to various quantities of food material being cooked.

Upon the upper central portion of the base plate 1 extends a hub 22, which is formed with a threaded opening to receive the threaded wing screw 23 which is provided with the thin flat head 24, which when turned in one direction will permit to be passed thereover the slots 25 and 26 of adjustable plates 27 and 28, and when turned through ninety degrees will lie crosswise of said slots, and by the proper amount of rotation and proper positioning will clamp plates 27 and 28 to hub 22, with said plates in either extended or retracted position as desired, to fit either a round or oblong vessel. As shown in Fig. 1, plates 27 and 28 may, if desired, be provided with openings 29 to permit the juices and liquids of the food being cooked to pass therethrough. Slots 30 are formed in plates 27 and 28 in such position that when said plates are retracted for use in a circular vessel these slots will pass over the basting tubes 16 and 17 to permit the rack or supporting plates 27 and 28 to be brought to circular contour or extended as desired. Plates 27 and 28 are at their outer ends provided with depending legs 31 to hold the rack substantially level when supporting food. My device is shown as applied for use in an oblong vessel 32 (shown in dotted lines) in Fig. 1, and to a vessel 33 that might be either round or oblong in Fig. 3. As seen in Fig. 3, the supporting rack (plates 27 and 28) may be supported at its center upon hub 22 and at its central side edges upon the metal of the base plate adjacent the bosses 8 and 9.

In the operation of my improved basting device a little water or other liquid is put into the bottom of the vessel and the base plate, with its upstanding basting tubes, placed in the center of the bottom of the vessel. The basting tubes are then swung to adjusted position to accommodate the size of vessel, the quantity of food material to be cooked and to be most advantageously positioned for the basting operation. The rack plates 27 and 28 may be used or not as desired. The meat, vegetables or the like, is then placed either on the top of the base plate or on the rack plates if the latter are used, and the fire beneath the bottom of the vessel is lighted and the vessel positioned preferably so that the basting device will be directly above the fire. When the liquid in the liquid spaces underneath the base plate nears the boiling point, bubbles or expanded molecules of liquid will begin to form and move toward the outlet openings 6 and 7 due to the inclination of the top wall of said liquid spaces and also due to the grooves 14 and 15 therein. When the pressure in these bubbles or expanded molecules of liquid becomes sufficiently increased by the heat the bubbles or expanded molecules of liquid will move upwardly through the basting tubes carrying the liquid with them and force such hot liquid out through the open upper end of these tubes, or out through the nozzles 20 and 21, if such nozzles are used, and onto the food material being cooked to baste the same. After the cooking has continued for awhile, the juices or gravy from the food will take the place of the water or other liquid initially placed in the bottom of the vessel, which juices will then form the basting medium; or, if desired, special basting liquids, such as melted butter, or other suitable liquids, may be used.

The basting liquid emerging from the upper ends of the basting tubes may be ejected or sprayed directly onto the meat, vegetables, or other food material being cooked, or, if desired, it may be caused to strike the under surface of the lid and drip down onto the food material in the vessel. Such variety of operation will, of course, be easily effected by using different shapes of nozzles, leaving the nozzles off, forming any desired bends or contour in the tubes, and other other manipulations obviously comprehended within the spirit of the invention disclosed.

The base plate of my device is a relatively flat, preferably duplex, inverted bowl forming a dihedral container, with a relatively large area as compared to its depth where it rests upon the bottom of the vessel over the usual diameter of the heat generating element, thus subjecting a widely spread out but relatively small quantity of liquid to quick temperature rise owing to the ratio of area to quantity, unit heat per unit time, and by the arrangement of the inlet notches 13 nearest the bottom of the inclines and farthest from the outlet tubes.

The contour and design of this base plate 1 (Figs. 1–4) is such as will best effectuate the spurting or spraying of liquids from a shallow pool of the basting liquid, gravy or the like. This is important also as regards the diluent for the juices or gravy, which would otherwise be excessive in amount in a large vessel wherein it might otherwise be necessary to cover the entire bottom of the vessel to a depth up to the top of the liquid spaces of the device.

The scientific principle underlying the ejectment of the hot liquid from the top or open end of the basting tubes or nozzles is much the same as that present in a coffee percolator or similar device, and hence need not be explained in detail further than as set forth earlier herein.

It is thus seen that my device may be used as an accessory to a large variety of sizes and shapes of cooking vessels without the necessity of having to provide a special vessel for each device, and possesses a wide range of adjustability. Due to its special construction it will operate more quickly and efficiently, with less quantity of liquid, without a special well or sump being formed in the bottom of the cooking vessel, with less heat and more positive action. It is economical to manufacture, will baste vegetables as well as meats or the like better than was possible prior to my invention, and will greatly lessen the shrinkage as well as improve the flavor of the food material being cooked.

Having now described one embodiment of my invention, I claim:

1. A basting device for food materials, comprising a base plate having a depending marginal flange and a top portion, said top portion being inclined upwardly and outwardly both ways from near the middle, said top portion having an opening therethrough at each of its diametrically opposite highest portions, and an upwardly extending basting tube in each of said openings, each of said basting tubes being angularly bent so as to be swingably adjustable into various positions.

2. A basting device for food materials, comprising a base portion having a shallow depression in its underneath face, said depression increasing in depth from near the middle of the base portion to the margin, an opening communicating with the deepest portion of said depression near said margin, a tube section rotatably seated in said opening, and a second tube section telescopically and rotatably mounted on the first tube section and adjustable in an axial direction with relation thereto, the above construction being limited to one-half of said base portion, the other half of said base portion being similarly constructed.

3. A basting device for food materials, comprising a base portion having a shallow depression in its underneath face, said depression increasing in depth from near the middle of the base portion to the margin, an opening communicating with the deepest portion of said depression near said margin, a tube section rotatably seated in said opening, and a second tube section telescopically and rotatably mounted on the first tube section and adjustable in an axial direction with relation thereto, the above construction being limited to one-half of said base portion, the other half of said base portion being similarly constructed, the two oppositely positioned depressions being connected at the middle of the base portion by a shallow opening extending a substantial distance across the underneath face of the base portion.

4. A basting device for food materials, comprising a shallow base portion adapted to be seated on the bottom of an ordinary cooking vessel, said base portion having formed in its under side a pair of symmetrically arranged shallow depressions, each of which gradually increase in depth from near the middle of the base portion outwardly toward the marginal edge, said depressions being of large area and small depth, means to permit the flow of liquid from the exterior of said depressions to the interior thereof, and basting tubes connected with said depressions at their portions of greatest depth.

5. A basting device for food materials, comprising a shallow base portion adapted to be seated on the bottom of an ordinary cooking vessel, said base portion having formed in its under side a pair of symmetrically arranged shallow depressions, each of which gradually increase in depth from near the middle of the base portion outwardly toward the marginal edge, said depressions being of large area and small depth, means to permit the flow of liquid from the exterior of said depressions to the interior thereof, and basting tubes connected with said depressions at their portions of greatest depth, said basting tubes being formed of sections adjustable with relation to each other and said base portion.

6. A basting device for food materials, comprising a shallow base portion adapted to be seated on the bottom of an ordinary cooking vessel, said base portion having formed in its under side a pair of symmetrically arranged shallow depressions, each of which gradually increase in depth from near the middle of the base portion outwardly toward the marginal edge, the top of said depressions forming a dihedral angle, said depressions being of large area relatively to the depth, and means for conducting hot liquid from said depressions and spurting it over the food for basting purposes.

7. A basting device for food materials, comprising a duplex base portion having formed in its underneath face a pair of symmetrically arranged shallow depressions of large area relatively to their depth, a basting tube connected with each of said depressions, an extensible and retractible supporting rack on top of said base portion, and means to secure said rack to said base portion in either extended or retracted position whereby to be usable in vessels of different shapes and dimensions.

8. A basting device for food materials, comprising a base plate having a depending marginal flange and a top portion, each of the two sides of said top portion being inclined outwardly and upwardly to form a pair of oppositely inclined hollow spaces beneath said top portion, and an opening in the highest portion of each of said inclined spaces adjacent the outer marginal edge of the plate, and a radial groove in the under face of each of the two sides of said top portion leading from near the center to one of said openings.

9. A basting device for food materials, comprising a shallow base portion adapted to be seated on the bottom of an ordinary cooking vessel, said base portion having formed in its under side a pair of symmetrically arranged shallow depressions, each of which gradually increases in depth from near the middle of the base portion outwardly toward the marginal edge, said depressions being of large area and small depth, means to permit the flow of liquid from the exterior of said depressions to the interior thereof, and basting tubes connected with said depressions at their portions of greatest depth, each of said tubes being angularly bent adjacent its lower end so that it is swingable into various positions to accommodate vessels of various sizes and give a variable range of distribution of the basting liquid.

GEORGE G. KITZEMAN.